United States Patent [19]

Kayanoki et al.

[11] Patent Number: 4,560,054

[45] Date of Patent: Dec. 24, 1985

[54] CLUTCH DISC STRUCTURE

[75] Inventors: Katsuhiko Kayanoki; Kazuo Teramachi; Seigo Ono, all of Kyoto; Yasuyuki Hashimoto, Osaka, all of Japan

[73] Assignees: Mitsubishi Jidosha Kogyo Kabushiki Kaisha; Kabushiki Kaisha Daikin Seisakusho, both of Japan

[21] Appl. No.: 514,801

[22] PCT Filed: Oct. 29, 1982

[86] PCT No.: PCT/JP82/00424

§ 371 Date: Jun. 21, 1983

§ 102(e) Date: Jun. 21, 1983

[87] PCT Pub. No.: WO83/01663

PCT Pub. Date: May 11, 1983

[30] Foreign Application Priority Data

Oct. 29, 1981 [JP] Japan ............................ 56-161631[U]
Oct. 29, 1981 [JP] Japan ............................ 56-16163[U]
Oct. 29, 1981 [JP] Japan ............................ 56-161633[U]

[51] Int. Cl.$^4$ ................................................ F16D 3/14
[52] U.S. Cl. ................................... 192/106.2; 464/66; 464/68
[58] Field of Search ........................ 192/106.2, 106.1; 464/66, 63, 68

[56] References Cited

U.S. PATENT DOCUMENTS 3,138,039  6/1964  Zeidler et al. ................... 192/106.2
4,471,863  9/1984  Lech, Jr. .......................... 192/106.2

FOREIGN PATENT DOCUMENTS 2503295  10/1982  France .............................. 192/106.2
 167919  12/1981  Japan .............................. 192/106.2

Primary Examiner—James C. Yeung
Attorney, Agent, or Firm—Oldham, Oldham & Weber Co.

[57] ABSTRACT

A clutch disc for an automobile transmits torque from engine to a transmission through a disc plate, a torsion spring and a hub connected to an output shaft. A bush is press-fitted between the sliding surfaces of the disc plate and the hub to reduce the surface pressure at the sliding surfaces and also to prevent intrusion of dust into the sliding surfaces. The torsion spring and a sub-torsion spring disposed between a hub plate and a friction plate holding the hub plate therein are retained at their both ends in position by means of spring-retaining lugs formed integrally with spring holding portions of the hub plate. Thus, generation of noise from the individual members is prevented.

4 Claims, 5 Drawing Figures

CLUTCH DISC STRUCTURE

TECHNICAL FIELD

This invention relates to the structure of a clutch disc in a clutch apparatus for an automobile, which clutch apparatus is constructed for absorbing a torque variation occurring during idling.

BACKGROUND ART

During transmission of drive power from an engine to a transmission through a clutch apparatus used hitherto in an automobile, rattling meshing noise is generated from the gears of the transmission due to non-uniform rotation of the engine especially when the engine is idling, that is, when the gears of the transmission are placed in a no-loaded condition.

Such a phenomenon is attributable to the fact that a variation of transmitted torque is directly transmitted to the transmission because the idling torque at the time of generation of such rattling meshing noise in the transmission is very small and the torsion spring acts as a rigid body.

Also, because of the provision of the backlash between the gears of the transmission, the gears collide against each other to act as a source of such rattling meshing noise. To deal with such a problem, a transmission type has been proposed in which an auxiliary gear is additionally associated with each of the gears to provide a backlash-less mechanism. However, the proposed transmission type is not commonly presently employed due to the complex structure and expensiveness of the apparatus. It is thus the present status that any countermeasure has not yet been taken since rattling meshing noise as described above is not heard during driving because of the loud background noise.

DISCLOSURE OF INVENTION

The present invention provides a clutch disc structure in which the surface pressure at the sliding surfaces of a hub plate of a hub splined to an output shaft, connected to a transmission, and a disc plate is reduced so as to prevent generation of noise during idling, and a bush is press-fitted between the disc plate and the hub so as to prevent intrusion of dust into the sliding surfaces, thereby preventing generation of noise.

Also, the present invention provides a clutch disc structure in which the surface pressure at the sliding surfaces of a hub plate of a hub splined to an output shaft, connected to a transmission, and a disc plate is reduced so as to prevent generation of noise during idling. A bush is press-fitted between the sliding surfaces of the disc plate and the hub to be located on at least one side of such surfaces so as to prevent intrusion of dust into the sliding surfaces, and the hub, the bush, and a friction member interposed between the hub plate and a friction plate are plated with satisfactory wear-resistive coatings thereby preventing generation of noise from the individual members.

Also, the present invention provides a clutch apparatus in which, in order to prevent generation of noise during idling and in order that a torsion spring and a sub-torsion spring may not abut and interfere with a friction plate held between the disc plate and the hub plate, spring-retaining lugs are formed integrally with the spring holding portions of the hub plate, thereby preventing generation of noise.

BEST MODE FOR CARRYING OUT THE INVENTION

Figure 1:
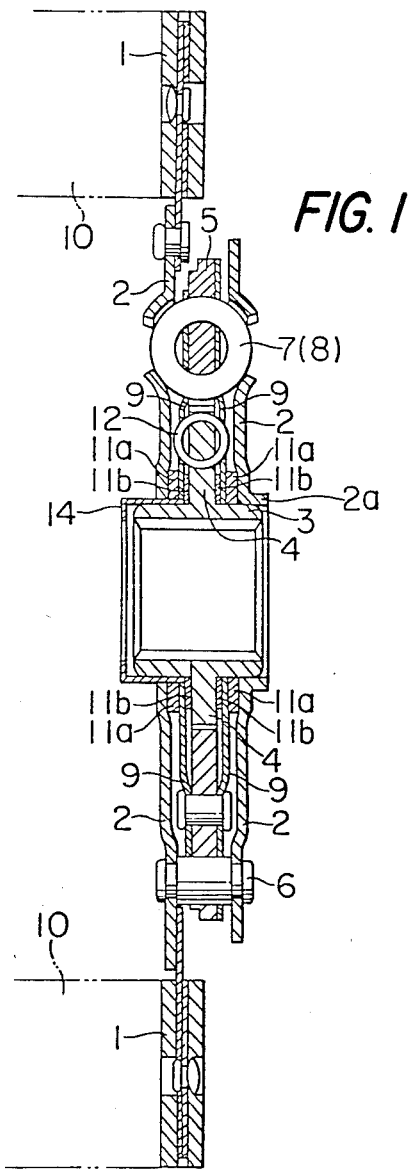
FIG. 1 is a longitudinal sectional view of the clutch disc according to the present invention.
Figure 2:
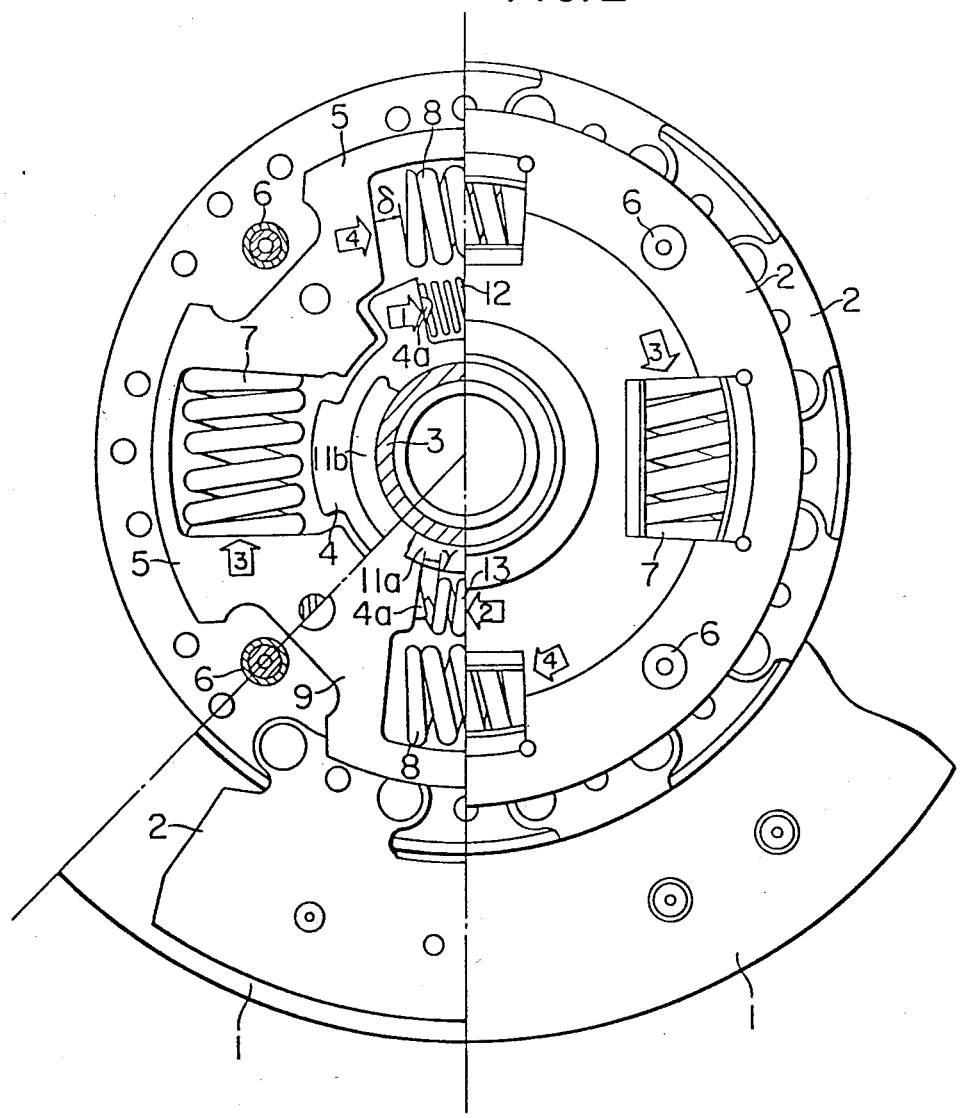
FIG. 2 is a partly cut-away, cross-sectional view illustrating principal parts of the clutch disc according to the present invention.

A preferred embodiment of the present invention will now be described in detail with reference to the accompanying drawings.

FIG. 1 to FIG. 4 show the structure of the clutch disc according to the present invention. Referring to the figures, 1 designates friction discs; 2 designates disc plates fixed to the friction discs 1; 3 designates a hub splined to an output shaft connected to a transmission (not shown); 4 designates a hub plate having four projections extending radially from the hub 3; 5 designates a torque plate disposed on the outer diametral side of the hub plate 4 to transmit the torque from the disc plates 2 to the hub 3 through the hub plate 4; 6 designates stop pins affixed to and extending between the ends of the disc plates 2 and inserted in grooves formed in the torque plate 5; and 7 and 8 designate a pair of torque springs and a pair of sub-torque springs respectively disposed between the disc plates 2 and the torque plate 5. A play having a clearance δ is provided between the pair of the sub-torque springs 8 and the torque plate 5.

9 designates friction plates disposed between the disc plates 2 and the hub plate 4, and 10 designates a flywheel connected to a drive shaft (not shown) of an engine.

Further, 11a and 11b designate pairs of friction members respectively. The former are disposed between the disc plates 2 and the friction plates 9 and are made of a material having a high coefficient of friction, and the latter are disposed between the friction plates 9 and the hub plate 4 and are made of a material having a low coefficient of friction, so as to control the fine adjustment of torque variation when the clutch is engaged.

Further, 12 and 13 designate a torsion spring disposed between the friction plates 9 and the hub plate 4 and a sub-torsion spring, respectively, disposed between the friction plates 9 and the hub plate 4, with a circumferentially directed play having a clearance Y. The torque transmission from the engine is arranged to be transmitted along the system shown in FIG. 1.

Figure 3:
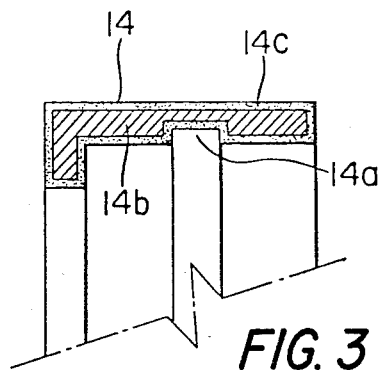
FIG. 3 is a sectional view of a part of the bush shown in FIG. 1.

Furthermore, a bush 14 is press-fitted between the sliding surface of the disc plates 2 and hub 3 to be located on at least one side of such surfaces for reducing the surface pressure. As shown in FIG. 3, the bush 14 is formed at its inner peripheral portion with a grease groove 14a for reducing friction with the hub 3.

Further, as shown in FIG. 1, a flange 2a is formed on the side of the disc plates 2 remote from the side where the bus 14 is press-fitted, for reducing the surface pressure between the disc plates 2 and the hub 3 and also for preventing intrusion of dust from the exterior.

The structure may be such that the bus 14 is press-fitted on both sides of the disc plates 2.

On the other hand, in order to decrease the coefficient of friction between the disc plates 2 and the hub 3 and hub plate 4 thereby limiting an increase in the hysteresis torque in the clutch disc, predetermined plated coatings are provided on the hub 3, friction members 11a, 11b and bush 14 for improving the resistance to wear.

More precisely, an electroless plated Ni coating is provided on the hub 3. It is preferable that the thickness is about 3–11μ, and the plated coating hardness is about Hmv 600–1,000. On the other hand, as shown in FIG. 3, a plated teflon-nickel composite coating 14c having a thickness of about 10–16μ and a plated coating hardness of about Hmv 450–550 is provided on the Fe base 14b of the bush 14. The firction member 11a and 11b are also similarly plated with a composite coating of teflon-nickel.

The plated composite coating has a low coefficient of friction depending on the content of teflon, and wear is remarkably little when it is combined with the members above described. Most excellent results from the aspect of maintainability of the low coefficient of friction were obtained when the content of teflon was selected to be 9±2% (per volume) with the remainder being Ni and the grain size of teflon was selected to be 0.3–1μ.

Figure 4A:
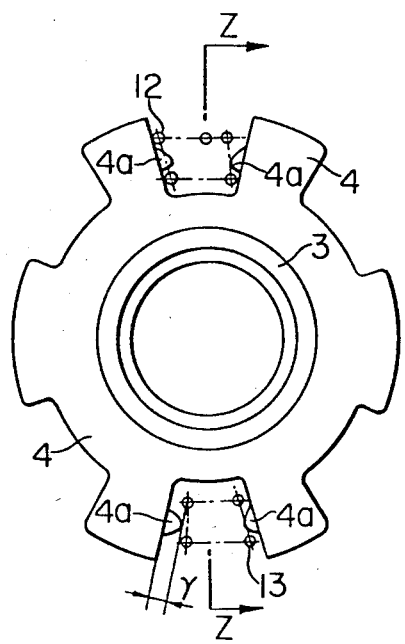
FIG. 4(a) is a front elevation view of the hub plate shown in FIG. 1.
Figure 4B:
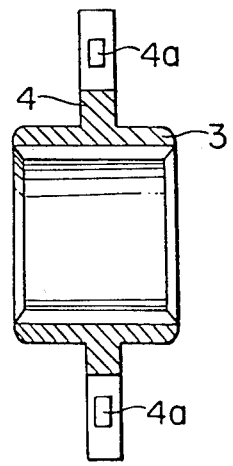
FIG. 4(b) is a sectional view taken along the line Z—Z in FIG. 4(a).

Further, in the area holding the torsion spring 12 disposed between the friction plates 9 and the hub plate 4 and in the area similarly holding the sub-torsion spring 13 therebetween with the clearance Y, spring-retaining lugs 4a are formed integrally with the spring holding portions of the hub plate 4 as shown in FIGS. 4(a), 4(b) so that the both ends of these springs may not be lodged or displaced toward the friction plates 9.

The system of torque transmission through the clutch disc having a structure as described above will now be explained. Especially, when the engine is in its idling condition, the torque is transmitted to the transmission from the region ①toward the region ④ in a manner as shown in FIG. 1. Now, the torque transmission in the individual regions will be explained.

First, in the region ① in the idling stage, the torque from the engine is transmitted to the torque springs 7 through the friction discs 1 and disc plates 2, and, without deflecting the torque springs 7, the torque is transmitted to the torsion spring 12 through the torque plate 5 and friction plates 9. Consequently, the torsion spring 12 is not appreciably deflected, and the torque is transmitted through the hub plate 4 to the hub 3 to be transmitted to the transmission.

Then, in the region ② in which the clutch is turned ON, the torsion spring 12 above described is not deflected beyond the plate corresponding to the clearance Y, and the torque is transmitted through the sub-torsion spring 13 to the hub plate 4, thence to the hub 3.

In the operation above described, the friction members 11a and 11b act to ensure smooth operation of the torque springs 7, torsion spring 12 and sub-torsion spring 13.

Then, when the load starts to be imparted as shown at the region ③, the sub-torsion spring 13 is deflected beyond the clearance Y, and, under the condition in which the torque plate 5 and the hub plate 4 are unitarily coupled together, the torque springs 7 are deflected by the amount corresponding to the clearance δ of the sub-torque springs 8 to transmit the torque to the hub 3.

Then, when the load is normally imparted as shown at the region ④, both of the torque springs 7 and the sub-torque springs 8 are deflected so that the torque from the engine is transmitted to the transmission through the hub plate 4 and hub 3.

Since the bush 14 is interposed between the sliding surfaces of the disc plates 2 and the hub 3, the surface pressure is small, and the predetermined plating applied to the individual members having the sliding surfaces improves the resistance to wear.

As described in detail hereinbefore, the clutch disc according to the present invention has such a structure that a bush is press-fitted between the sliding surfaces of the hub and the disc plates and thus exhibits very marked practical effects among others that the surface pressure at the sliding surfaces can be reduced, and intrusion of dust into the sliding surfaces can be prevented.

Further, in the clutch disc structure according to the present invention, the bush is press-fitted between the sliding surfaces of the hub and the disc plates so as to reduce the surface pressure at the sliding surfaces, and, also, the individual members having the sliding surfaces are plated so as to decrease the coefficient of friction thereby remarkably improving the wear resistance of the individual members providing the sliding surfaces. Therefore, the present invention exhibits very marked practical effects among others that the noise and vibration can be reduced.

Further, in the clutch disc structure according to the present invention, a torque plate engageable with the hub plate is disposed on the outer diametral side of the hub of the transmission output shaft, and a sub-torsion spring is mounted with a plate between said hub plate and the torque plate so as to absorb a torque variation occurring when the clutch is turned ON from the engine idling condition. Therefore, the present invention exhibits such effects among others that generation of collision noise between the hub plate and the torque plate can be prevented and, also, generation of rattling meshing noise in the transmission can be prevented.

Further, in the clutch disc structure according to the present invention, the torsion spring disposed between the friction plates and the hub plate and the sub-torsion spring similarly disposed therebetween with a clearance are retained in position by being positioned at their both ends by the spring-retaining lugs formed on the spring holding portions of the hub plate, so that these springs may not interfere with the friction plates due to lodging or displacement of the springs attributable to a torque variation not only during idling but also during clutch engagement. Therefore, the present invention exhibits very marked practical effects among others that generation of hysteresis torque can be suppressed, and generation of noise can also be prevented.

While in accordance with the patent statutes, a preferred embodiment and best mode has been presented, the scope of the invention is not limited thereto, but rather is measured by the scope of the attached claims.

We claim:

1. A clutch disc structure including a pair of disc plates holding friction discs, a hub for transmitting torque transmitted from said disc plates to an output shaft, a torque plate disposed on the outer diametral side of the hub of said output shaft, at least one torque spring disposed between said disc plates and said torque plate to serve as buffer means acting in the direction of rotation, and at least one torsion spring disposed between said torque plate and said hub to serve as buffer means acting in the direction of rotation, characterized in that at least one cylindrical bush is disposed between the sliding surfaces of said disc plates and said hub at one side of such surfaces and press-fitted in the inner periphery of one of said disc plates.

2. A clutch disc structure as claimed in claim 1, characterized in that said hub, said bush and a friction member engaging with said hub are provided respectively with predetermined plated coatings which decrease the coefficient of friction.

3. A clutch disc structure as claimed in claim 1, characterized in that said bush is formed at its one end with a portion bent radially inwardly.

4. A clutch disc structure including a pair of disc plates holding friction discs, a hub for transmitting torque transmitted from said disc plates to an output shaft, a torque plate disposed on the outer diametral side of the hub of said output shaft, at least one torque spring disposed between said disc plates and said torque plate to serve as buffer means acting in the direction of rotation, and at least one torsion spring disposed between said torque plate and said hub to serve as buffer means acting in the direction of rotation, characterized in that said torsion spring is disposed between a hub plate formed on said hub and a pair of friction plates fixedly mounted on said torque plate and holding said hub plate between the friction plates, and both ends of said torsion spring are retained in position by means of spring-retaining lugs formed integrally with spring holding portions of said hub plate.

* * * * *